United States Patent Office 3,457,747
Patented July 29, 1969

3,457,747
ROLLING MILLS
Kenneth A. Yeomans, Stoneleigh, England, assignor to
The British Iron and Steel Research Association
Filed Dec. 28, 1966, Ser. No. 605,478
Claims priority, application Great Britain, Dec. 28, 1965, 54,934/65
Int. Cl. B21b 37/12, 37/08, 39/08
U.S. Cl. 72—8                                           11 Claims

ABSTRACT OF THE DISCLOSURE

A multi-stand rolling mill with means at each stand for detecting the driving torque developed in that stand, material to be rolled is threaded therethrough and deformed the desired degree. The successively detected torque values are stored, computer processed and used to regulate following stands to produce uniform interstand tensions in the material being rolled.

---

This invention is concerned with improvements in and relating to rolling mills and it is an object of this invention to provide a multi-stand mill which will operate close to a predetermined tension value between stands, a value which in certain cases would be close to zero, such as in mills rolling billets, bars and rods.

According to this invention there is provided a multi-stand rolling mill in which each stand is independently driven and means are provided for producing a signal indicative of a characteristic existing at each stand when material at a predetermined interstand tension is deformed to the desired degree in that stand, control means being provided operable to provide said predetermined tension in dependence upon the said signal.

Thus in a multi-stand mill a device may be provided to give an indication of the difference between the torque developed as each stand is threaded and before the material enters the next stand and the torque developed when the next stand has been threaded. Thus if the rolls of that next stand are turning so as to tend to pull the material through the preceding stand, the operator can see the degree of change between the torque previously developed at that preceding stand and the torque developed upon threading of the next stand whereby he can adjust the motor of that first stand or the stand just threaded so that the torque developed at the first threaded stand returns to its "no-tension" value which existed before the succeeding stand was threaded.

Alternatively the torque difference indication given at each stand may be adjusted to give a preselected interstand tension pattern through the mill.

According to a further feature of the invention, means may be provided to automatically restore the original "no-tension" torque value and such means may be operable when all the stands have been threaded.

To determine the tension free torque rolling values, let zero tension rolling torque of stand 1 be $G_1$. Then, if tension $t_1$ exists between stands 1 and 2 this torque will decrease by a value $at_1$ to $g_1 = G_1 - at_1$. With this back tension on stand 2 its rolling torque will increase by a factor $b^1 t_1$ to give a measured value $g_2 = G_2 + b^1 t_1$, until the stock enters stand 3 and front tension $t_2$ develops.

Until this point is reached $$g_2 = G_2 + \frac{b^1}{a}(G_1 - g_1)$$

and $G_2$ may be deduced.

When the stock enters stand 3 tension $t_2$ will develop and $g_2$ will alter to the new value $g_2 = G_2 + b^1 t_1 - b t_2$ and stand 3 will develop a torque $g_3 = G_3 + c^1 t_2$ from which $$G_3 = g_3 - \frac{c^1}{b}\left[G_2 - g_2 + \frac{b^1}{a}(G_1 - g_1)\right]$$

Consider firstly:
Stock in stand 1 only $$g_1 = G_1$$

Hence
$$G_1 = g_1$$

Stock in stands 1 and 2 only $$g_1 = G_1 - at_1$$
$$g_2 = G_2 + b^1 t_1$$
$$= G_2 + (G_1 - g_1)\frac{b^1}{a}$$

Hence $$G_2 = g_2 - (G_1 - g_1)\frac{b^1}{a}$$

Stock in stands 1, 2 and 3 only $$g_1 = G_1 - at_1$$
$$g_2 = G_2 + b^1 t_1 - b t_2$$
$$g_3 = G_3 + c^1 t_2$$

Hence $$G_3 = g_3 - \left[(G_2 - g_2) + (G_1 - g_1)\frac{b^1}{a}\right]\frac{c^1}{b}$$

Stock in stands 1, 2, 3—$n$ $$Gn = g_n - \sum_{r=1}^{n-1} a_r(Gr - g_r)$$

By using a calculator the values $G_1$, $G_2$ may be found and can be compared with the torque being developed Any stand in error can be adjusted to reduce the individual errors to zero. This calculation can be effected by a digital machine, though a simplified device may be used.

In order that the invention may be well understood there will now be described some embodiments of control, given by way of example, reference being made to the accompanying drawings in which.

In the foregoing, $a$, $b$ and $c$ are constants, $a_r$ being a constant value (close to unity) for each stand of the mill for each particular pass sequence.

Figure 1:
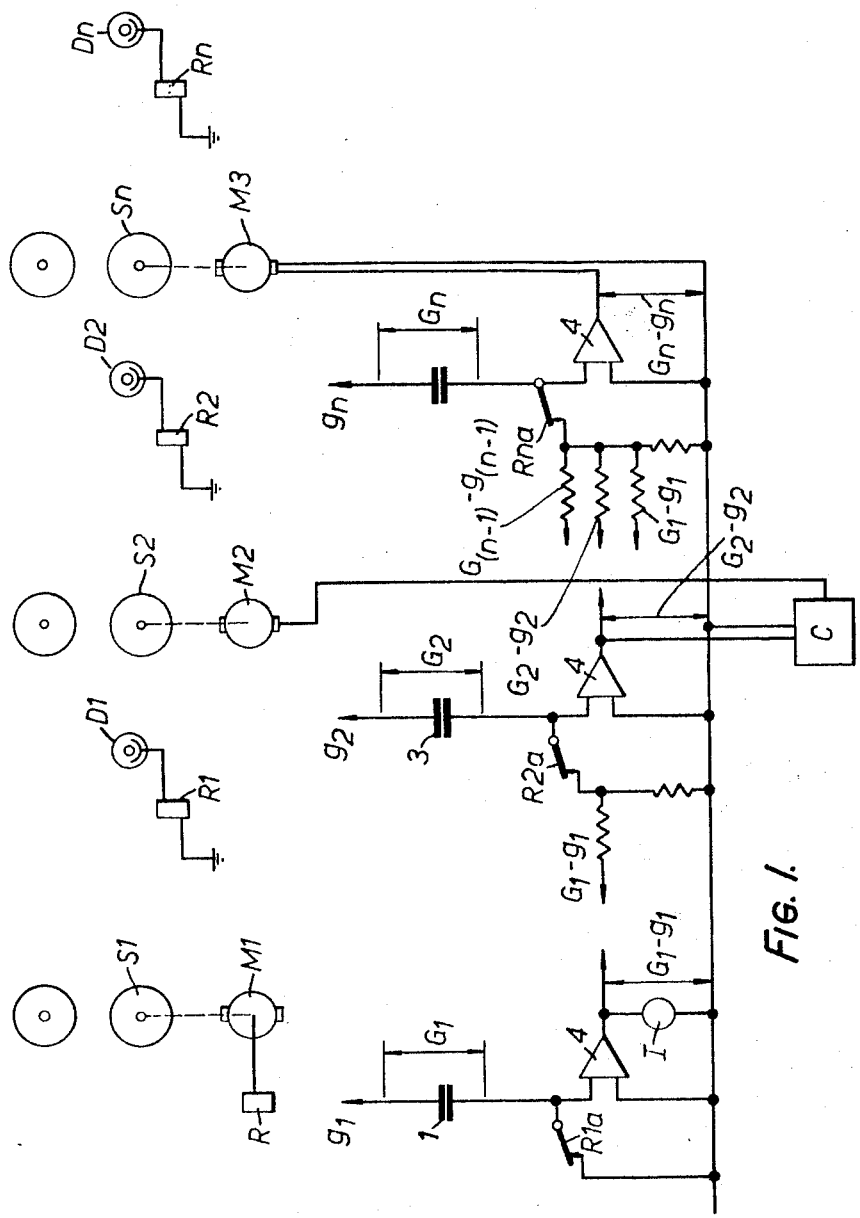
FIGURE 1 is a diagrammatic arrangement for calculating $G_1 G_2 \ldots G_n$; and shows three alternative controls to remove any deviation from the torque value at predetermined tension.

Referring to FIGURE 1, the circuit for the first stand S1, driven by motor M1 comprises a memory device 1 here shown as a capacitor, but which may be for example a motor driven potentiometer, to which is applied a voltage proportional to the torque developed by the first stand motor which in many cases, to a sufficiently close approximation, is proportional to the motor current of the first stand motor, by way of switch R1a. With stand S1 threaded but not stand S2 the memory device will store a value proportional to the "no-tension" rolling torque. Just before the material enters stand S2 contacts R1a are opened by relay R1 actuated on passage of the material being rolled past a photocell D1 and when the material is in stand S2 the measured torque $g_1$ at stand S1 is compared with the "no-tension" torque $G_1$ at that stand to indicate any torque change. The difference between "no-tension" torque $G_1$ and the measured torque $g_1$ is fed by way of amplifier 4 to a visual indicator 1 whereby the operator can adjust the motor of stand S1 by regulator R. Likewise for stand S2 a similar circuit is provided but this includes the memory device 3 to store $G_2$, a feed in of the torque developed at stand S1 which influences the interstand tension of stands S1 and S2 and hence the "no-tension" torque of stand S2.

Given the torque error (or change) values the operator can as indicated at stand S1 of FIGURE 1, then adjust the speed settings of the motor M1 driving stand S1 by means of a conventional regulator R so that the torque error is diminished to zero or to a value that will result in a desired pattern of interstand tension. It will be understood that similar indicators and regulators would be provided at each stand.

Where the mill is to be automatically controlled to provide "no-tension" rolling, the motor speed settings may be corrected in two ways. For each stand in a continuous rolling mill there is an approximate linear relationship between the correction that must be made to the speed setting and the error that exists between the desired and actual value of torque that is provided by the drive motor. The constant of proportionality is a unique value for each stand of the mill when it is set up to roll a particular product. If a digital computer C is used (see stand S2, FIGURE 1) to control the rolling mill motor M2 then the alterations to be made to the motor speed settings can be determined, using predetermined constants of proportionality, from the signal $G_2$—$g_2$ by the computer, and the corrections may be applied to the mill motor from the computer.

As an alternative (see stand Sn of FIGURE 1) when the expense of a computer is to be avoided the errors that exist in the torque may be fed by way of amplifier 4 and applied to the drive motor M3. In a preferred arrangement the percentage rate of correction is directly related to the aforementioned constant of proportionality.

Figure 2:
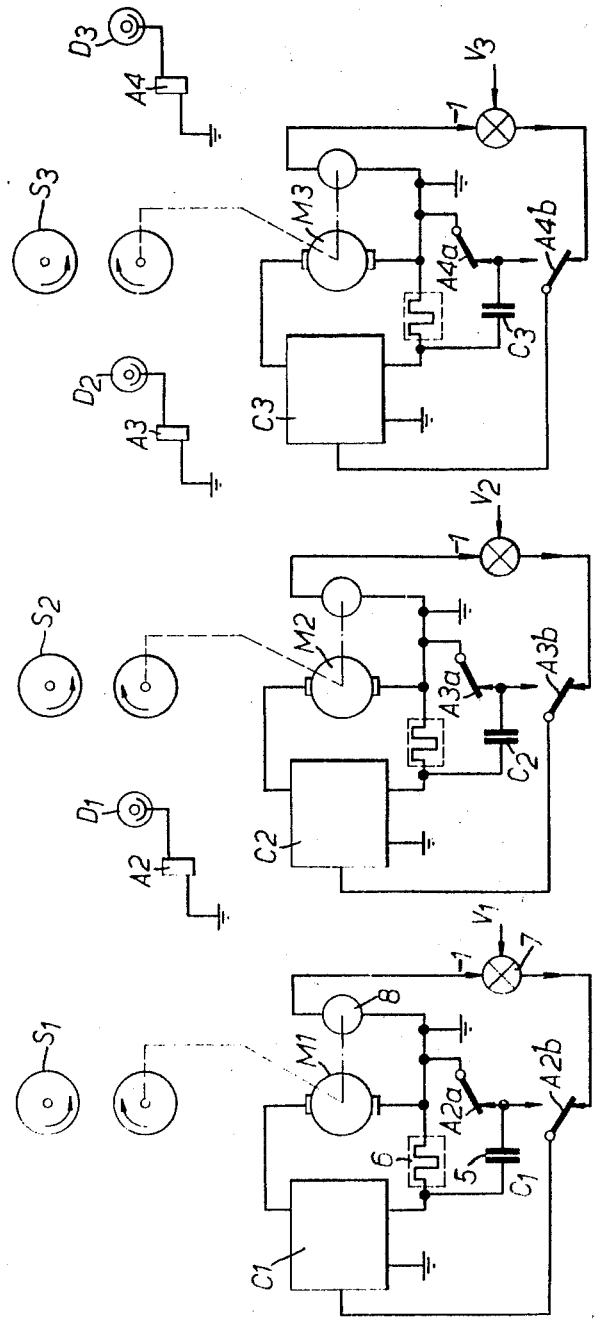
FIGURE 2 is a diagrammatic control for stands each having fast response drives.

In an arrangement of stands having rapid response drives the circuits of FIGURE 2 may be adopted where the torques are held at their correct values rather than calculating corrections to be made for subsequent adjustments. In this a memory device 5, here shown as a capacitor, is in parallel initially, that is before the next stand is threaded, with a resistor 6 in the drive circuit of motor M1 of stand S1 with contacts A2 a closed voltage appearing across resistor 6 is proportional to the developed torque and when contacts A2a are opened the capacitor will retain the voltage proportional to the developed torque immediately prior to this event. The stand is run initially at a preselected speed which is represented by a signal $v_1$ fed to a comparison device 7 to which is also fed a signal from a motor driven tachogenerator 8. The first stand therefore is speed controlled through controller C1 in accordance with a small error signal from the comparison device 7 until the next stand is threaded. Prior to entry of the stock into stand S2 relay A2 is tripped by a photocell D1 responsive to arrival of the material. The memory device voltage is then applied to the drive controller C1 through contacts A2G and is compared with a voltage proportional to the developed torque. When stock enters stand S2 the drive of stand 1 would be controlled to maintain the torque (current) of stand 1 close to its previous value. In the event of the speed of the rolls at stand S2 corresponding to a faster rate of rolling than at stand S1 then stand S1 will be accelerated to deliver material at this new rate of rolling with only a small synchronising tension, for, with the proposed mode of control, stand 1 would offer very small resistance to change of speed. Similarly, when stock enters stand S2 the mode of control of stand S2 would be altered to maintain stand S2 at its previous rolling (tension free) value. Stand S2 and stand S1 would be accelerated as necessary to the new flow rate determined by stand S3.

With the above method of control the quantity rate is defined by the stand most recently threaded and individual stands are altered to adjust to this rate. To avoid transient compressions it is desirable that succeeding stands should be initially adjusted for a slightly increasing flow rate.

Figure 3:
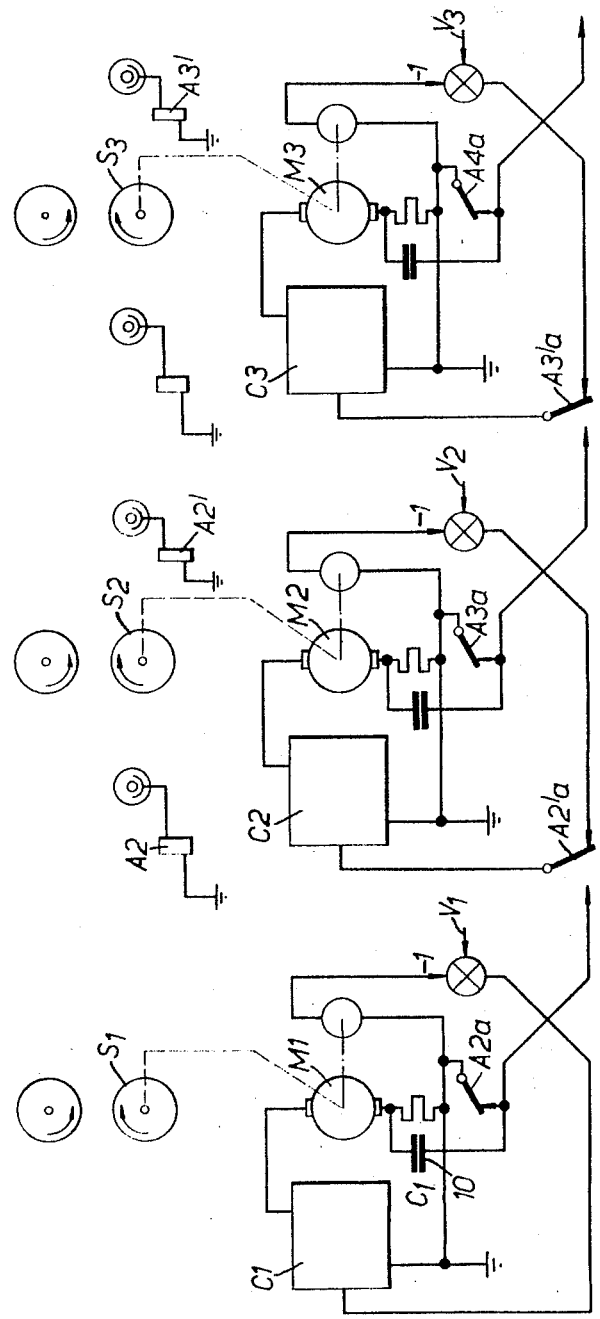
FIGURE 3 is a diagrammatic control for controlling each "next threaded stand"

The alternative system in which the speed of the most recently threaded stand is altered to adjust the stand torques to their previous values may have advantages in some instances. In this system, shown diagrammatically in FIGURE 3, the speed of the first stand S1 would be fixed and the speed of the second stand S2 adjusted to a value where the current of motor M1 is at the value that existed before entry into stand S2. Similarly after entry into stand S3 the speed of this stand would be adjusted in accordance with the deviations of the current of stand S2 from its initial value previous to threading stand S3.

The circuit for this system is similar to that of FIGURE 2 but the measured "no-tension" torque value is now available from memory device 10 of stand S1 to the drive controller C2 of stand S2 upon relay A2 being tripped as stock approaches stand S2, th relay operating contacts A2a. Just after stock enters stand S2, relay A2' operates contacts A2'a and that stand is then controlled in relation to the value stored at memory device 10 of stand S1.

If the yield characteristic $k$ of the material changes after threading, then the individual motor drive torques must be adjusted proportionately, so that each motor adjusts itself to the new tension free torque requirement.

Figure 4:
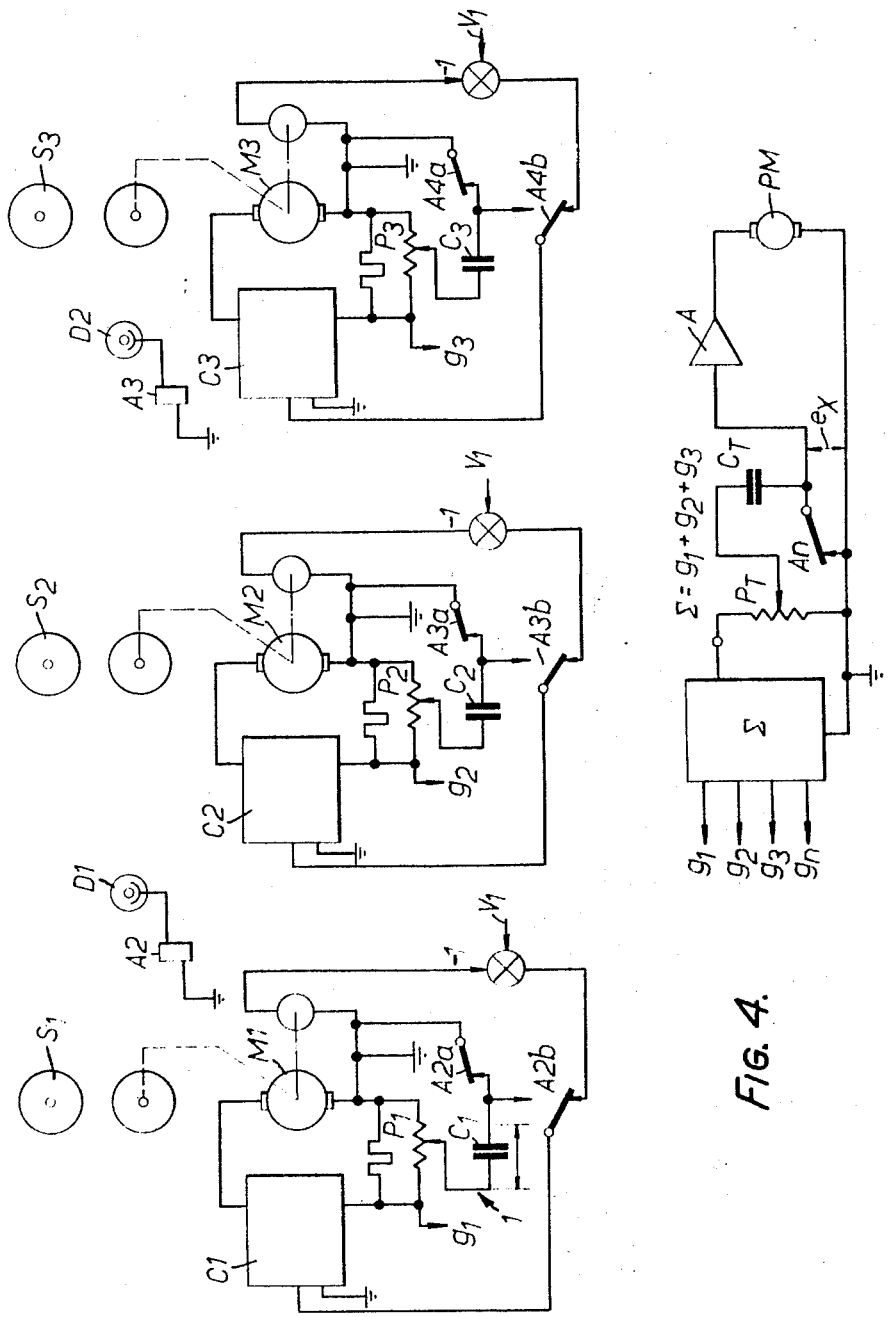
FIGURE 4 is a diagrammatic arrangement for control in response to increased total torque in the event of change of material yield characteristics.

Turning to FIGURE 4 there is shown an arrangement similar to that of FIGURE 2 but with means for summing the measured torques and adjusting these proportionally to the sum of the torques to maintain the correct interstand relationships in the event of change of yield of the stock being rolled.

In the circuit of FIGURE 4 it will be seen that potentiometers $P_1$, $P_2$ etc. are connected between the torque signals $g_1$, $g_2$ . . . and the memory devices, here shown as capacitors $C_1$, $C_2$ etc. The circuit is otherwise similar in action to that of FIGURE 2.

There is also an added circuit (FIG. 4) which consists of a device for summation of the signals $g_1$ etc., to give a total torque signal, and an amplifier A and motor P.M. which drives all the stand potentiometers in unison so that equal fractions of the signals $g_1$, $g_2$ etc. are selected by the adjustable taps.

The function of the potentiometer circuit is as follows:
With no material in the rolling mill it is arranged that the contact An is closed and that the potentiometers are all at some preselected fraction of their travel—say a fraction $n^1$. As material enters the mill the torques of the motors $g_1$, $g_2$, etc., increase in turn to tension free values as the material threads the mill as in the case of the circuit of FIGURE 2. When the mill is completely threaded then the signal appearing on condenser $C_T$ will be $$n^1 \Sigma G$$

where $\Sigma G = G_1 + G_2 + G_3$ . . . $G_1$=tension free torque values etc. If now the contact $A_N$ is opened the voltage $e_x$ will be the difference between $n^1 \Sigma g$ and $n \Sigma G^1$. If $\Sigma g$ remains unchanged then $e_x$ will remain at 0, but if $\Sigma g$ should alter—due to change in material temperature— then $e_x$ will not be 0 and the motor will be driven until the potentiometer $P_T$ assumes a new position with a fraction $n$ so that $$n \, \Sigma g = n^1 \, \Sigma G$$

i.e.

$$\frac{n}{n^1} = \frac{\Sigma G}{\Sigma g}$$

At the same time the potentiometers $p_1$ etc. will also move to the new value $n$ so that the individual motor torque values $g$ assumes values such that for instance $$ng_1 = n^1 G_1$$

i.e.

$$g_1 = \frac{n^1}{n} G_1 = G_1 \frac{\Sigma g}{\Sigma G}$$

similarly $$g_2 = G_2 \frac{\Sigma g}{\Sigma G}$$

and $$g_1 : g_2 : g_3 = G_1 : G_2 : G_3 \text{ etc.}$$

i.e. the torque ratios remain constant despite changes in total torque $\Sigma g$.

It is to be understood that the contact A$n$ is to be closed (so that further motion of the potentiometers is inhibited) just before the tail end of the billet passes through stand 1.

The arrangement of FIGURE 4 is satisfactory when there are not extreme differences in temperatures of the material between the first and the last stand. For such an eventuality significantly different percentage changes in the torque values of the motor may be required.

For this reason the invention also provides a system in which the torques of individual stands will be adjusted to their correct value in accordance with change in rolling load and there is, in theory, no direct restriction on the temperature gradient along the material being rolled.

This system is based on the fact that the ratio $g/p$, when $g$=measured torque and $p$=measured rolling load, is substantially independent of temperature and yield value of the material being rolled. The ratio decrease with net forward tension at a stand and increases with back tension, these effects being such that the motor will always be driven to reduce interstand tension.

Figure 5:
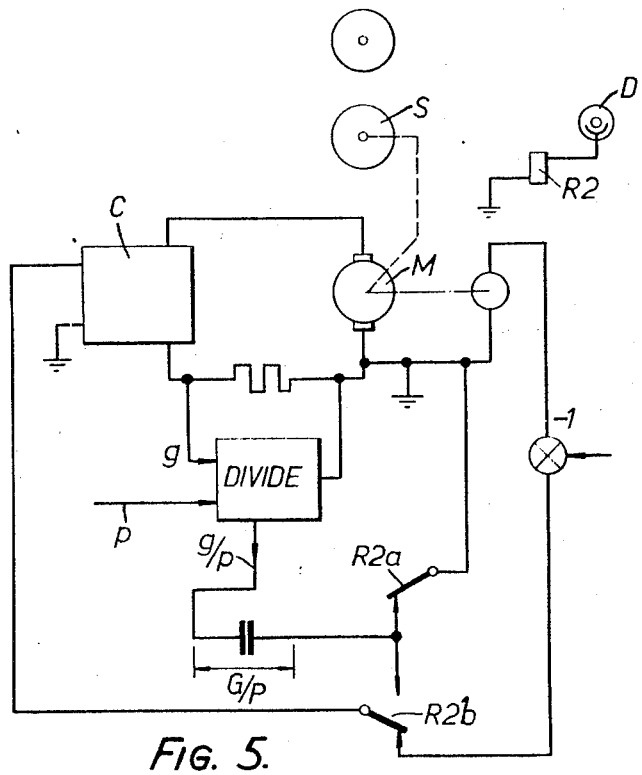
FIGURE 5 is another diagrammatic control to control torque in response to change in yield characteristic, and FIGURE 6 diagrammatically illustrates a circuit for a divider.

FIGURE 5 shows a circuit, for an individual stand S, of a FIGURE 2 type system where the ratio $g/p$ is maintained constant instead of $g$.

It involves the use of a dividing element to produce a signal $g/p$ and tension free value $G/P$.

Figure 6:
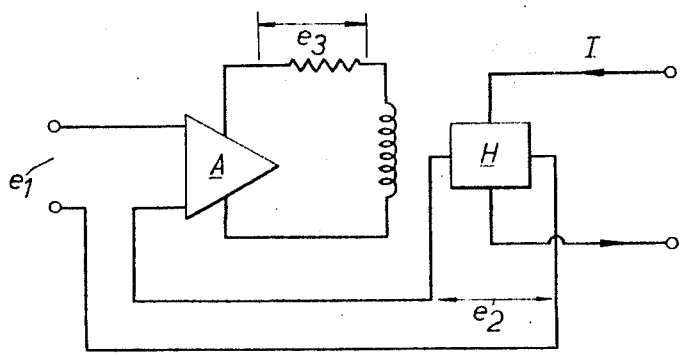

A circuit for a divider is shown in FIGURE 6. This uses a Hall effect element H which gives an output voltage $e_2$ which is given by the product of a magnetic field and a current I passed through the element.

In the circuit shown the amplifier A acts in such a way that the signal $e_3$ is proportional to the magnetic field and the voltage $e_2$ is equated to an input voltage $e_1$, i.e. $e_1 = e_2 = k_1 \, e_3 \, I$ where $k_1$ is constant if now $e_1$ is proportional to the rolling torque $g$ and the current I is proportional to the rolling load $p$ we have $$g = k \, e_3 \, p$$

where $k$ is constant, i.e.

$$e_3 = \frac{1}{k} \left( \frac{g}{p} \right)$$

which is of the required form.

What I claim is:

1. A multi-stand rolling mill in which each stand is independently driven and means are provided for producing a signal indicative of a stand characteristic existing at each stand when material at a predetermined interstand tension is deformed to the desired degree in that stand, control means responsive to said signal to provide said predetermined tension in dependence upon the said signal.

2. A multi-stand rolling mill comprising independently driven stands, means for producing a signal indicative of the torque developed by the drive at each stand to obtain desired deformation of the workpiece at a predetermined interstand tension between that stand and other stands, means for producing a signal indicative of the torque developed at each stand when the next succeeding stand has been threaded, means for comparing said signals and means for providing an indication of the difference therebetween the regulator means operable to adjust the torque developed at that stand to the value developed at the predetermined tension.

3. A multi-stand rolling mill according to claim 2 in which means are provided to display an output from the signal comparing means whereby an operator can, by the regulator means, reduce the said output to zero.

4. A multi-stand rolling mill according to claim 2 in which means direct the output from the signal comparing means to a calculating device operable to determine the speed setting of the drive of that stand to produce the torque developed at the predetermined tension.

5. A multi-stand rolling mill according to claim 2 in which amplifier means are provided to amplify the output of the signal comparing means, the drive motor of that stand being responsive to the output of said amplifier means.

6. A multi-stand rolling mill comprising independently driven stands, means for producing a signal indicative of the torque developed by the drive at each stand to obtain desired deformation of the workpiece at a predetermined interstand tension between that stand and other stands, a memory device and means to feed to that device said signal indicative of the torque developed by the drive motor of that stand at predetermined tension, and means operative by approach of the material to the next stand to apply the output of the memory device to a motor control comparison unit, means for feeding to the comparison device a signal indicative of torque developed at each stand upon threading of the succeeding stand and for applying the difference to a motor control to maintain the torque developed at the predetermined tension.

7. A multi-stand rolling mill according to claim 6 including means for producing a roll speed control signal and means for producing a signal indicative of actual roll speed, a speed comparison device being provided to compare the speed control signal and actual roll speed signal, means for applying the output of the speed comparison device to the stand motor until the memory device output is applied to the motor control comparison unit.

8. A multi-stand rolling mill according to claim 6 including means for summing the individual stand torques at predetermined tension, means for summing the individual stand torques actually developed and means for comparing the sums, a controller being provided responsive to the difference of said sums to maintain the ratios of the actual torques constant.

9. A multi-stand rolling mill according to claim 2 in which means are provided to produce a signal indicative of rolling load and divider means whereby the signals indicative of torque at predetermined tension and torque actually developed are divided by the signal indicative of rolling load before comparison.

10. A multi-stand rolling mill according to claim 1 in which the first stand is speed controlled to accept a constant input rate, means are provided at each stand to produce a signal indicative of roll speed when that stand is threaded but not the succeeding stand, means are provided to store the speed value represented by that signal and means for applying that value to the drive of the succeeding stand when it is threaded whereby that succeeding stand is set to develop the torque at the preceding stand.

11. A method of operating a multi-stand rolling mill comprising controlling the speed of the first stand, storing the value of roll speed of each stand before the succeeding stand is threaded, and feeding the stored value to the succeeding stand when that is threaded and regulating the speed of that succeeding stand by comparing the speed at threading with the value obtained from the preceding stand.

References Cited

UNITED STATES PATENTS

| | | | |
|---|---|---|---|
| Re. 25,075 | 10/1961 | Hessenberg | 72—9 |
| 2,264,277 | 12/1941 | Cook | 72—205 |
| 2,345,765 | 4/1944 | Michel | 72—205 |
| 3,101,016 | 8/1963 | Gill | 72—205 |
| 3,169,421 | 2/1965 | Bloodworth | 72—234 |
| 3,290,912 | 12/1966 | Reid | 72—205 |
| 3,332,292 | 7/1967 | Roberts | 72—8 |

MILTON S. MEHR, Primary Examiner

U.S. Cl. X.R.

72—19, 205, 234